United States Patent
Hermann et al.

(10) Patent No.: US 6,961,560 B2
(45) Date of Patent: Nov. 1, 2005

(54) METHOD AND DEVICE FOR PROMPT AND EFFICIENT SERVICE DISCOVERY IN WIRELESS NETWORKS

(75) Inventors: Reto Hermann, Buttikon (CH); Dirk Husemann, Adliswil (CH); Michael Moser, Zurich (CH); Michael Elton Nidd, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 10/141,050

(22) Filed: May 7, 2002

(65) Prior Publication Data

US 2002/0176391 A1 Nov. 28, 2002

(30) Foreign Application Priority Data

May 23, 2001 (EP) .......................................... 01112542

(51) Int. Cl.[7] .............................................. H04B 7/00
(52) U.S. Cl. .................... 455/414.1; 455/466; 455/458; 455/456.3
(58) Field of Search .......................... 455/414.1, 414.3, 455/3.01, 3.06, 458, 41.2, 426.2, 466, 456.3; 705/1, 10, 14; 707/202

(56) References Cited

U.S. PATENT DOCUMENTS

| | | | | |
|---|---|---|---|---|
| 5,555,266 A | * | 9/1996 | Buchholz et al. | ........... 370/347 |
| 5,873,043 A | * | 2/1999 | Comer | ........................ 455/458 |
| 6,026,297 A | * | 2/2000 | Haartsen | ................... 455/426.1 |
| 6,154,745 A | * | 11/2000 | Kari et al. | ................... 707/100 |
| 6,233,430 B1 | * | 5/2001 | Helferich | ..................... 455/458 |
| 6,484,033 B2 | * | 11/2002 | Murray | ..................... 455/456.3 |
| 6,532,368 B1 | * | 3/2003 | Hild et al. | .................. 455/515 |
| 6,577,849 B1 | * | 6/2003 | Eaton et al. | ................ 455/3.01 |
| 6,691,173 B2 | * | 2/2004 | Morris et al. | ............... 709/249 |
| 2003/0046100 A1 | * | 3/2003 | Yamauchi | ....................... 705/1 |
| 2003/0112804 A1 | * | 6/2003 | Kamarainen et al. | ........ 370/390 |

FOREIGN PATENT DOCUMENTS

EP 1 022 876 A1 1/1999

* cited by examiner

*Primary Examiner*—Emmanuel L. Moise
*Assistant Examiner*—Kamran Afshar
(74) *Attorney, Agent, or Firm*—Louis P. Herzberg

(57) ABSTRACT

Methods, system and apparatus are provided for advertising service offerings in a communication system. An example embodiment comprises at least one device. A first device broadcasts a message of a first type, chooses a value for a time limit and listens for a message sent by a second device. If no message has been received before time limit, elapse, it again broadcasts a message of a first type. Otherwise, the message received from said second device is analyzed and if said message includes valid information about said first device chooses a value for the time limit. However, if said message received does not include valid service description about said first device, a message of a second type is broadcast. This reduces useless broadcast of a complete service list. Broadcast may be initiated more often and, service discovery for new devices coming into proximity takes less time.

14 Claims, 2 Drawing Sheets

METHOD AND DEVICE FOR PROMPT AND EFFICIENT SERVICE DISCOVERY IN WIRELESS NETWORKS

FIELD OF THE INVENTION

The invention is directed to wireless local area networks and the communication between the devices forming such a network. More specifically, the present invention relates to a communication scheme which allows devices within the wireless local area network to announce their service and/or discover services provided by other devices.

BACKGROUND OF THE INVENTION

Computer terminals and peripherals have become dramatically smaller and more portable. Personal computers and peripherals are small enough to sit on the desk at work. Smaller still are lap top computers and notebook computers. There are computer terminals which are small enough to be mounted in a vehicle such as a delivery truck. Still smaller are the hand held terminals typically used for their portability features where the user can carry the terminal in one hand and operate it with the other. A physical connection of the above devices by means of cables or fibers might have drawbacks, such as configuration constraints because of the limited length of the cable, limited number of ports on the computer thus limiting the number of peripherals that can be attached, cumbersome reconfiguration of hardwired devices, etc. Note that there are some cable or fiber based communication systems where the limited number of ports on the computer does not really limit the number of peripherals Ethernet is one example of a communication system where the cable is used as a shared medium (other examples are token ring, FDDI (Fiber Distributed Data Interface), and DQDB (Distributed Queue Dual Bus)).

The smaller the devices get, the more important it becomes to replace fixed physical connections by wireless ad-hoc connections (e.g. body networks, radio frequency connections, or infrared connections), since physically connecting the computer terminals, peripherals, and other devices by means of cables or fibers severely reduces the efficiency gained by making the units smaller. Ad-hoc connections are required where devices move around, enter an area and exit the area. The term ad-hoc refers to the need for frequent network reorganization.

Local area communications are rapidly evolving into what can be called personal local area networks, which are networks for communication between local peers or subsystems. These kind of networks will herein be referred to as local networks. Wireless communication is of particular importance in such local networks. There are different wireless communications approaches known that have been developed and designed with an eye on the communication between peers or subsystems of such local networks.

EP 1 022 876 A1 discloses an apparatus for exchanging service information with other devices. The presented apparatus comprises a transceiver, a processing unit, a memory for storing information about its local services and/or services provided by other devices, and a protocol resource manager. In an initial step the protocol resource manager triggers the transceiver to send service information, comprising information about itself and/or other known devices to other devices. Then it chooses a time-out value $T_A$ and ensures that the apparatus listens for up to a maximum time $T_A$ for service information received by said transceiver. If $T_A$ timed out without having received such service information by said transceiver, the resource manager triggers said transceiver to start with the initial step. If such service information was received by said transceiver prior to $T_A$ timing out, the resource manager checks whether said service information received comprises current and accurate information about itself. If yes, it chooses another time-out value $T_A$ and continues with the step of ensuring that the apparatus listens for up to a maximum time $T_A$. If no, then the same behavior is observed, excepting that $T_A$ is chosen from an earlier time range than normal.

Furthermore, a scheme for advertising service offerings in a communications system is presented. The scheme comprising two devices, wherein a first of said two devices in an initial step sends service information, comprising current and accurate information about itself and/or other known devices. In a next step it chooses a time-out value $T_A$. Then it listens for up to maximum time $T_A$ for service information sent by another device. Subsequently, if $T_A$ has timed out it continues with the initial step, otherwise it checks whether or not service information sent by another device comprises information about itself (local services). If yes, then it continues with the step of choosing a time-out value. If no, then the same behavior is observed, excepting that $T_A$ is chosen from an earlier time range than normal.

SUMMARY OF THE INVENTION

An aspect of the present invention is to provide an efficient method and device for service discovery in wireless networks. In an example embodiment, this aspect is achieved by a method and a device which provides for advertising service offerings in a communication system comprising at least one device. A first device broadcasts a message of a first type, chooses a value $T_A$ for a time limit and listens and waits for a message sent by a second device.

According to a particular embodiment of the present invention the message of the first type comprises a digest of the service description of the first device and/or a digest of the service description of other devices, the service description of which are stored in the first device. Furthermore, the message of the second type comprises the service description of the first device and/or the service description of other devices, the service description of which are stored in the first device.

According to another embodiment of the present invention, the first device maintains a counter for each service description and the counter is incremented for a service descriptions whenever the service description is broadcast with a message. In addition, the counter values may be analyzed for deriving a value indicating the distance between the first device and any of the other known devices.

A further embodiment of a method and device according to the present invention employs a push-model to distribute service descriptions to an environment of nodes that can communicate with each other through some wireless communication technology. Thus, instead of asking for a particular service and then waiting for an answer, the information gets pushed into the environment.

Advantageously, the present invention limits or avoids useless broadcast of a complete service list, since the complete service list is not broadcast every time, even if no other node might be around and thus able to receive the broadcast. Furthermore, a redundant broadcast of the complete service list is advantageously omitted also in the case when a service is about to expire, i.e., its time-to-live will reach zero within the next few seconds. Other aspects, features and advantages of the present invention, will be apparent in the following detailed written description.

BRIEF DESCRIPTION OF THE DRAWINGS

The invention aspects and advantages are best understood by reference to the following detailed description of an illustrative embodiment when read in conjunction with the accompanying drawings, wherein.

DETAILED DESCRIPTION OF THE INVENTION

Figure 1:
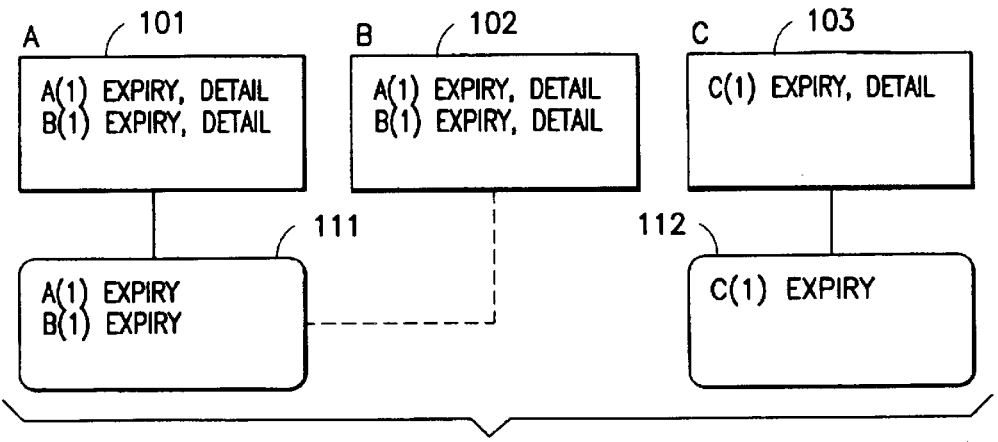
FIG. 1 shows a first exemplary scenario to illustrate the present invention.

The present invention provides efficient methods, apparatus and systems for service discovery in wireless networks. In an example embodiment, this is achieved by a method and a device which provides for advertising service offerings in a communication system comprising at least one device. A first device broadcasts a message of a first type, chooses a value $T_A$ for a time limit and listens and waits for a message sent by a second device. If no message has been received before elapse of the chosen time limit, the method and the system continues with again broadcasting a message of a first type. Otherwise, the message received from the second device is analyzed and if the message includes valid information about the first device, the method and device continues with choosing a value $T_A$ for a time limit. However, if the message received from the second device does not include valid service description about the first device, a message of a second type is broadcast.

According to a particular embodiment of the present invention the message of the first type comprises a digest of the service description of the first device and/or a digest of the service description of other devices, the service description of which are stored in the first device. Furthermore, the message of the second type comprises the service description of the first device and/or the service description of other devices, the service description of which are stored in the first device. In some cases, only a digest of the service description is sent for all devices for which the information received from the second device is valid, whereby the information received by the second device is formed by either the service description or a digest of it.

According to another embodiment of the present invention, the first device maintains a counter for each service description and the counter is incremented for a service descriptions whenever the service description is broadcast with a message. In addition, the counter values may be analyzed for deriving a value indicating the distance between the first device and any of the other known devices. This is sometimes accomplished by filtering out devices having a counter value higher than a predetermined threshold and considering them as to be too far away. Furthermore, a service is sometimes marked as being too far away in response to a message indicating that such service is too far away, whereby the message originates from a service considered not too far away.

An embodiment of a method and device according to the present invention employs a push-model to distribute service descriptions to an environment of nodes that can communicate with each other through some wireless communication technology. Thus, instead of asking for a particular service and then waiting for an answer, the information gets pushed into the environment. By having other nodes formed by the different devices repeat what they have received the information of available services gets distributed.

Advantageously, the present invention avoids useless broadcast of a complete service list, since the complete service list is not broadcast every time, even if no other node might be around and thus able to receive the broadcast. Furthermore, a redundant broadcast of the complete service list is advantageously omitted also in the case when a service is about to expire, i.e., its time-to-live will reach zero within the next few seconds.

Other art methods and devices tend to choose fairly large service expiry times to conserve power on battery-driven devices to delay the energy 'expensive' broadcast of the entire service list as long as possible. However, the present invention advantageously overcomes such drawback by broadcasting only a minimum amount of data. Hence, according to the present invention the broadcast may be initiated more often and, consequently, the service discovery for new devices coming into proximity will take less time.

The concept of the present invention reduce or prevent propagation of services of nodes that are announced via second or third hand but that are in fact not reachable. Another advantage is that in a method or device in accordance with the present invention it is possible to derive an indication of service invocation failure, i.e., a failure to invoke an advertised service. Other aspects, features and advantages of the present invention, will be apparent in the following detailed written description.

The method and device of the present invention operate in an environment as subsequently described. There are at least two nodes, also referred to as devices, whereby the nodes are formed by some communication unit that is meant to establish a wireless communication connection to another communication unit. Each node maintains a list of service descriptions and participates in advertising its services via a broadcast mechanism. Such a wireless communication may be established in any communication system, such as a local network.

For the purpose of the present description, a local network is defined as being a network composed of at least two devices within mutual communication range of each other. Within such a local network the devices communicate with each other without the need for a wired network. The local network might be established by means of infrared (IR), radio-frequency (RF) or other means, such as the user's body. A local network does not need to have an access point for connection to a fixed network. The local network may be completely isolated from any other network, or it might comprise one or more access points which provide the (wireless) devices with access to the wired network.

A service is described by a service description, which includes a time-to-live indicator, i.e., a value representing a predetermined instant of time or time limit after its expiration the respective service is deemed to be unavailable. In case the service is still available a refresh of the indicator with a new value is required. The service description further includes the address of the node offering the service, whereby the address may be of a different format depending which communication technology or communication protocol is being used.

An underlying broadcast mechanism works as follows. Broadcasts are scheduled to occur within regularly recurring time windows, whereby only one node should broadcast in every window and the broadcasting node is determined by a race mechanism. That is a procedure in which all nodes schedule a broadcast at an individually chosen time in the future, then reschedule upon either receiving a broadcast from one of the other devices or reaching the chosen time (without having received a broadcast) and sending a broadcast themselves. Nodes that detect their own service descriptions about to time out increase their chance to broadcast by choosing a shorter random back-off time.

Each node processes a newly received service list in the following way. Services that are already known to the local device, are offered by other devices, and have time-to-live values farther in the future than the locally held time-to-live values for those same services, have the local time-to-live values updated accordingly. Services that are not already known to the local device and are offered by other devices, are added to the set of services known to the local device. Services that are offered by the local device and either fail to appear in the received list of services, or appear but have time-to-live values insufficiently far in the future, are noted to signal the local device to schedule its next broadcast from an earlier than normal range.

Embodiments according to the present invention operate as described in the following in greater detail. Each device regularly broadcasts a message of a first type, referred to as "ping" to its environment. A ping is a broadcast to the environment including a service description digest $D_d$ of known services. When a device X observes a ping by another device Y, that either does not include X's services or a version of one X's services that is outdated, it broadcasts a message of a second type, referred to as "pong". A pong includes full service descriptions for those services that were missing or outdated in the ping. When device X did not know any of the services included in the ping, it responds with a pong where the service versions $V_S$ of the unknown services are set to nil. When the service description of one of the services offered by a device changes, the device will send a pong including a full service description for that service and an incremented service version $V_S$.

When device U comes into reach of, for example, the three devices X, Y and Z there are two situations. First, device U send its ping broadcast first. In response, any of the devices X, Y and Z will answer with a pong including the full service descriptions and having U's service versions set to nil. U will then respond with a pong. Second, one of the devices X, Y, or Z sends a ping first. In response, device U will answer with a pong including its full service descriptions and the service versions of the ping set to nil. Then any of the devices X, Y, or Z will respond with a pong.

Depending on resources available, a node may choose to send a blast instead of a pong or just do so from time to time to establish a synchronized view of the environment, whereby a blast is a broadcast of the complete service description list $L_d$ (including complete service descriptions) to the environment.

The present invention will now be explained with some exemplary scenarios as depicted in FIGS. 1 to 5. In all Figures there are three rectangular boxes marked by the addresses of the respective devices A 101, B 102 and C 103. The rectangular boxes represent internal lists of known services at each device. The lists comprise the description of their own service and about other services that they have previously received. For example, "A(1), expiry, detail", wherein "A" represents the address of the device offering the respective service and "1" the version number of this description. The expression "expiry" illustrates the time limit, i.e., the useful lifetime for this advertisement that gets renewed for local services at each broadcast time. The word "detail" states whether or not a detailed description of the service being offered is available. A rounded box under a device description represents a broadcast advertisement being sent and a dotted line identifies a device that receives the related advertisement.

With reference now to FIG. 1, there are depicted two groups of devices. A first group includes of device A 101 and B 102, whereas a second group just includes of device C 103. All devices are in steady state, i.e., they have already received all detail service descriptions of other devices in reach. However, the first and the second group are not in communication range of each other. Hence, the advertisement 112 sent by device C 103 is received neither by device A 101 nor device B 102. Similarly, the advertisement 111 sent by device A 101 is only received by device B 102, as indicated by the dotted line, but not by device C 103. Therefore, none of the devices start sending the details of their services offered.

Figure 2:
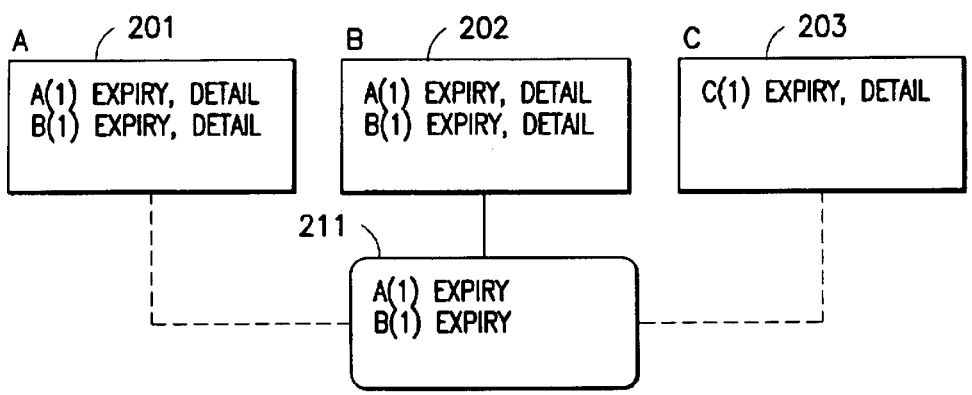
FIG. 2 shows a second exemplary scenario to illustrate the present invention.

Now with reference to FIG. 2, device C 203 has moved into communication range with devices A 201 and B 202. The next to broadcast of the three devices happens to be B 202. Now, C 203 receives the broadcast 211, as illustrated by the dotted line, and identifies two qualities. First, its local offerings are missing and, second, two unknown services are listed, since only compressed entries have been broadcast.

Figure 3:
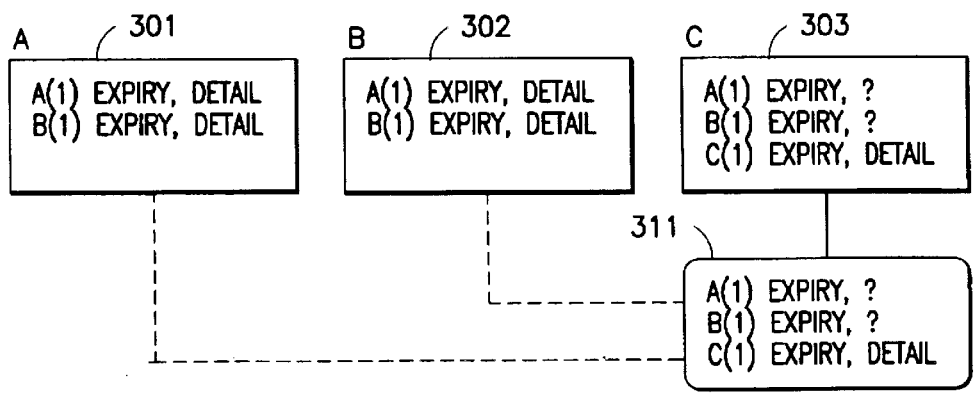
FIG. 3 shows a third exemplary scenario to illustrate the present invention.

With reference now to FIG. 3, because of these unusual events, device C 303 selects its next broadcast time from a shorter range than usual, ensuring that it will advertise 311 before either device A 301 or device B 302. Since neither device A 301 nor device B 302 have seen any unusual information in the previous round, their time limit before sending another message will stay the same. When device C 303 sends its broadcast 311, it has responded to the two qualities of the round shown in FIG. 2 above as follows. First, it includes a fully qualified version of its own services in the message and, second, it explicitly requests details about the unknown compressed entries, as illustrated by the question marks at the respective positions in the list (In a physical embodiment, this query might be represented by nil version numbers). Both devices A 301 and B 302 receive this advertisement, and notice one unusual quality. Namely, explicit requests have been made to expand service offerings for which they know the details.

Figure 4:
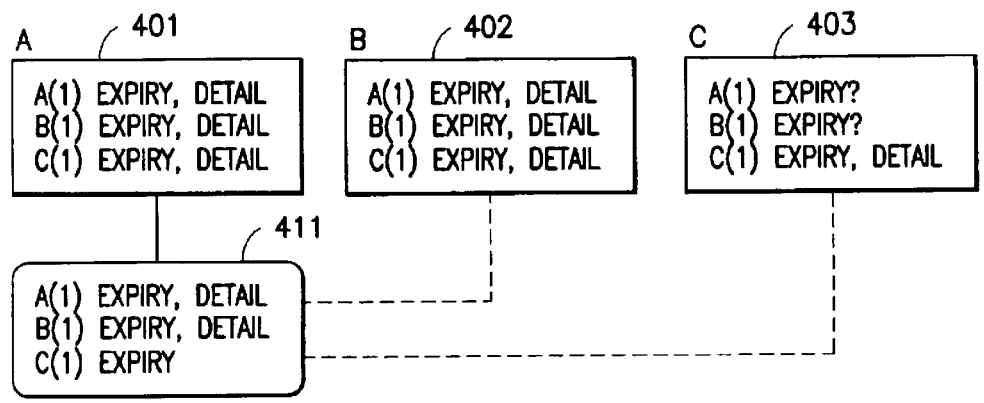
FIG. 4 shows a forth exemplary scenario to illustrate the present invention.

Referring now to FIG. 4, both devices A 401 and B 402 have received the advertisement from C 403 and, having identified a need to transmit further information. Therefore, they select their next broadcast time from a shorter range than usual, just as C 403 did in the round shown in FIG. 3. Either A 401 or B 402 could win this race. In the example shown in FIG. 4, however, it is device A 401 that wins. Device A 401 creates an advertisement 411 with fully qualified descriptions of both of the requested services, and sends it.

Both devices B 402 and C 403 receive the broadcast. Device B 402 has now seen the description request satisfied, therefore, it schedules its next broadcast from the usual range. Device C 403 now knows the full description of all services that it has heard of, and also sees its own services are known about, so it also schedules its next advertisement from the usual range.

Figure 5:
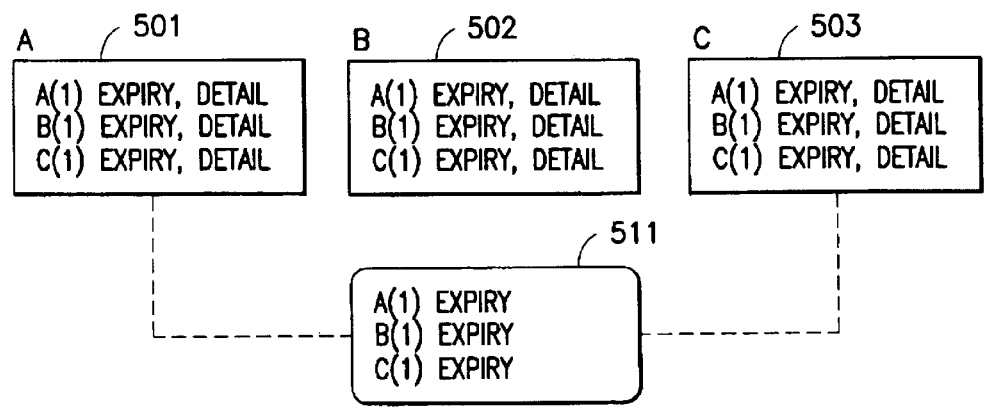
FIG. 5 shows a fifth exemplary scenario to illustrate the present invention.

All three devices 501, 502, 503 are now in steady state, as shown in FIG. 5, taking turns to renew their own services and advertise just as in the basic algorithm.

In another embodiment the present invention includes a hop count $H_S$ with each service description—both in the short service description $d_S$ and the full service description $D_S$. Each node N will increment $H_S$ when including it in its service description digest $D_d$ (or its service description list $L_d$). Low hop counts might imply a close distance to the service providing node, high hop counts might hint at a large distance. Using the hop count a node may filter out those service descriptions that it considers too far away, a configurable threshold value is used to distinguish devices of different distance.

A further embodiment of the present invention introduces the possibility to signal service invocation failures to the environment. A node can broadcast a service description digest $D_d$ including a short service description $d_S$ with a reserved value for service expiry time of let say "−1" to indicate that it failed to invoke the service. Other nodes that receive the broadcast can choose to heed the advice and expire the service in their internal service list. Alternatively, they can ignore the advice, for example, when their hop count $H_S$ of the service concerned is far less than the hop count announced in the service digest, as in this case the service invocation failure might be due to invoking and invoked nodes being out of reach.

According to another embodiment of the present invention each node uses some averaging function to obtain a smoothed version $h_s$ of the hop counts it receives. One example of such an averaging function is $$h'_S = \frac{h_S \cdot H_S}{a_1 \cdot H_S + a_2 \cdot h_S}$$

with $h'_S$ representing the revised (new) value for $h_S$ and, e.g., $a_1=0.8$ and $a_2=0.2$. This averaging function favors small hop counts over large hop counts. Other functions are of course possible.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method comprising advertising service offerings in a wireless communication system including at least one device wherein a first device performs the steps of:

broadcasting a message of a first type, choosing a value for a time limit, listening and waiting for a message from a second device, if no message has been received until elapse of said time limit, continuing with the step of broadcasting a message of a first type, otherwise analyzing the message received from said second device and if message includes valid information about said first device, continuing with the step of choosing a value for a time limit, and broadcasting a message of a second type, if said message received from said second device does not include valid service description about said first device, wherein the first device maintains a counter for each service description, and further comprising the step of incrementing the counter for service descriptions broadcast with a message, and further comprising the step of analyzing counter values and deriving a value indicating a distance between the first device and any of the other known devices.

2. The method according to claim 1, wherein said message of the first type comprises a digest of a service description of the first device.

3. The method according to claim 2, wherein said message of the first type comprises a digest of service descriptions of other devices, the service descriptions being stored in said first device.

4. The method according to claim 1, wherein said message of the second type comprises the service description of the first device.

5. The method according to claim 1, wherein said message of the second type comprises the service descriptions of other devices, the service description of which are stored in said first device.

6. The method according to claim 4, wherein only a digest of the service description is sent for all devices, for which information received from the second device is valid.

7. The method according to claim 1, wherein the information received by the second device is formed by one of the service description, a service description digest.

8. The method according to claim 1, wherein the step of analyzing counter values includes the step of filtering out devices having a counter value higher than a predetermined threshold.

9. The method according to claim 1, wherein the step of marking a service to be too far away in response to a message indicating such service is too far away, whereby the message originates from a service considered not too far away.

10. The method according to claim 1, wherein messages of the first and the second type include counter values related to the service descriptions.

11. A system for advertising service offerings in a communication system comprising at least one device, the device comprising means adapted to perform the method according to claim 1.

12. A computer program product stored on a computer usable medium, comprising computer readable program means for causing a computer to perform a method according to claim 1.

13. An article of manufacture comprising a computer usable medium having computer readable program code means embodied therein for causing advertisement of service offering in a wireless communication system including at least one device, the computer readable program code means in said article of manufacture comprising computer readable program code means for causing a computer to effect the steps of:

a first device performs the steps of:

broadcasting a message of a first type, choosing a value for a time limit, listening and waiting for a message from a second device, if no message has been received until elapse of said time limit, continuing with the step of broadcasting a message of a first type, otherwise analyzing the message received from said second device and if message includes valid information about said first device, continuing with the step of choosing a value for a time limit, and broadcasting a message of a second type, if said message received from said second device does not include valid service description about said first device, wherein the first device maintains a counter for each service description, and further comprising the step of incrementing the counter for service descriptions broadcast with a message, and further comprising the step of analyzing counter values and deriving a value indicating a distance between the first device and any of the other known devices.

14. A program storage device readable by machine, tangibly embodying a program of instructions executable by the machine to perform method steps for advertising service offerings, said method steps comprising the steps of:

a first device performs the steps of;

broadcasting a message of a first type, choosing a value for a time limit, listening and waiting for a message from a second device, if no message has been received until elapse of said time limit, continuing with the step of broadcasting a message of a first type, otherwise analyzing the message received from said second device and if said message includes valid information about said first device, continuing with the step of choosing a value for a time limit, and broadcasting a message of a second type, if said message received from said second device does not include valid service description about said first device, wherein the first device maintains a counter for each service description, and further comprising the step of incrementing the counter for service descriptions broadcast with a message, and further comprising the step of analyzing counter values and deriving a value indicating a distance between the first device and any of the other known devices.

* * * * *